US010625842B2

(12) United States Patent
Rapport (10) Patent No.: US 10,625,842 B2
(45) Date of Patent: Apr. 21, 2020

(54) LIGHTER-THAN-AIR FRACTAL TENSEGRITY STRUCTURES

(71) Applicant: Nathan Rapport, Middleton, WI (US)

(72) Inventor: Nathan Rapport, Middleton, WI (US)

(73) Assignee: Nathan Rapport, Malden, MA (US)

( * ) Notice: Subject to any disclaimer, the term of this patent is extended or adjusted under 35 U.S.C. 154(b) by 614 days.

(21) Appl. No.: 14/807,118

(22) Filed: Jul. 23, 2015

(65) Prior Publication Data
US 2017/0021907 A1    Jan. 26, 2017

(51) Int. Cl.
*B64B 1/08* (2006.01)
*B64B 1/14* (2006.01)

(52) U.S. Cl.
CPC .............. *B64B 1/08* (2013.01); *B64B 1/14* (2013.01); *B64C 2201/022* (2013.01)

(58) Field of Classification Search
CPC ........ B64B 1/08; B64B 1/14; B64C 2201/022
USPC ........................................................ 244/125
See application file for complete search history.

(56) References Cited

U.S. PATENT DOCUMENTS

| | | | | |
|---|---|---|---|---|
| 1,191,077 A * | 7/1916 | Hermanson | ............... | B64B 1/00 244/107 |
| 1,715,829 A * | 6/1929 | Geisler | .................... | B64B 1/00 244/125 |
| 4,113,206 A * | 9/1978 | Wheeler | .................. | B64B 1/40 244/125 |
| 5,285,986 A * | 2/1994 | Hagenlocher | ............ | B64B 1/60 244/125 |
| 5,645,248 A * | 7/1997 | Campbell | ................. | B64B 1/00 244/125 |
| 6,056,240 A * | 5/2000 | Hagenlocher | ............ | B64B 1/08 244/125 |
| 6,581,873 B2 * | 6/2003 | McDermott | .............. | B64B 1/08 244/24 |
| 7,261,255 B2 * | 8/2007 | Li | ............................ | B64B 1/04 244/125 |
| 9,102,391 B2 * | 8/2015 | Brutoco | .................... | B64B 1/12 |
| 9,266,597 B1 * | 2/2016 | Pasternak | ................ | B64B 1/08 |
| 9,623,954 B2 * | 4/2017 | Kempshall | ............... | B64C 3/44 |

* cited by examiner

*Primary Examiner* — Brian M O'Hara
*Assistant Examiner* — Keith L Dixon
(74) *Attorney, Agent, or Firm* — Michael W. Vary (57) ABSTRACT

The purpose of this invention, which is referred to as a vacuustat, is to generate buoyancy in the atmosphere by means of an evacuated or partially evacuated container, rather than by using a lighter-than-air lifting gas such as hydrogen or helium. This particular vacuustat design comprises a flexible airtight membrane supported by a fractal tensegrity internal structure consisting of a relatively small mass of compressive members forced into higher-order buckling modes through use of tension members. The advantages of such a design over conventional aerostats include superior buoyancy control for ascent and descent, greatly increased flight endurance, and cost-effectiveness in operation. This particular vacuustat design has a much greater lifting efficiency than previous designs, and should also be easier and more cost-effective to manufacture.

8 Claims, 4 Drawing Sheets

LIGHTER-THAN-AIR FRACTAL TENSEGRITY STRUCTURES

CROSS-REFERENCES TO RELATED APPLICATIONS

This application is entitled to the benefit of Provisional Patent Application Ser. No. 62/031,294, filed Jul. 31, 2014.

STATEMENT REGARDING FEDERALLY SPONSORED RESEARCH OR DEVELOPMENT

Not applicable.

MICROFICHE APPENDIX

Not applicable.

BACKGROUND OF THE INVENTION

1. Field of the Invention

This invention relates to the field of lighter-than-air (LTA) structures, specifically LTA structures that generate their buoyancy through use of one or more evacuated or partially evacuated containers instead of a lifting gas such as hydrogen or helium. This invention comprises a flexible airtight membrane supported by an internal structure consisting of a relatively small mass of compressive members forced into higher-order buckling modes through use of tension members.

2. Description of Prior Art

Vacuustats are defined here as lighter-than-air (LTA) structures that use an evacuated or partially evacuated container instead of a lifting gas (such as hydrogen or helium) to generate buoyancy. The obvious difficulty in designing such structures is the requirement for the structure to be strong enough to resist the large atmospheric pressures being applied to it while simultaneously weighing less than the air that it is displacing.

While discussing the properties of various structures, useful lift will be defined as a structure's mass subtracted from the mass of the air that the structure is displacing, and lifting efficiency will be defined as a structure's useful lift divided by the mass of the air that it is displacing. For example, the USS Macon, the largest helium airship ever built, displaced 225,400 kg of air but had a useful lift of only 65,300 kg, and therefore had a lifting efficiency of 29%. The maximum lifting efficiency of an aerostat using hydrogen gas is 92.7%, while the maximum lifting efficiency of an aerostat using helium is 85.5% (the maximum lifting efficiency of a vacuustat is of course 100%).

The concept of a vacuustat can be dated back to 1670, when the Italian monk Fransesco Lana de Terzi illustrated a flying boat utilizing evacuated spherical shells. Since then, a number of other designs for vacuustats (under different names) have been proposed. However, with the exception of U.S. Pat. No. 11,127,613 to Akhmeteli and Gavrilin in 2006 and U.S. Pat. No. 11,633,928 to Barton in 2010, none have rigorously addressed the structural analysis required to prove their design's viability, and have therefore failed to support their claims.

As discussed in the Akhmeteli/Gavrilin patent, a hollow sphere of homogenous material (as with de Terzi's design and others') is an unsatisfactory structural design, since even diamond is not light and strong enough for such a design to work. However, Akhmeteli/Gavrilin's own solution suffers from a number of drawbacks, such as a low lifting efficiency, which makes carrying useful payloads uneconomical and precludes the possibility of reaching high altitudes, and reliance on large amounts of ceramic and/or other exotic materials, which makes the structure expensive and difficult to manufacture. On the other hand, the structural analysis in Akhmeteli/Gavrilin's patent shows that with the right structure, it is possible to design viable vacuustats with currently existing materials, which is an encouraging result.

Barton's design uses a set of inflatable cells to form a vacuum chamber. While Barton's stability analysis suggests that his design could produce a vacuustat using currently existing materials, whether it can produce a vacuustat with a high lifting efficiency at a reasonably low cost requires further analysis. Since Barton's approach differs significantly from the one that will be presented here, Barton's design will not be discussed further.

An example of a more closely related patent is U.S. Pat. No. 10,383,444 to Shearing. Shearing's design for a vacuum vessel uses a tensegrity dodecahedron, which he claims could be used to create a structure that is lighter than the air it displaces. A structural analysis of his design fails to support this, but is useful for understanding where and how the difficulties are manifested.

For our analysis, assume that Shearing's structure is spherical, the struts are made of diamond, and that the strings (or cables) are infinitely strong, have negligible weight, and won't produce any unwanted bending moments in the struts or change the shape of the structure under tension. The average force on a strut can be approximated as $$f(l_s) = \frac{s_1 \Delta P_{atm} \pi c^2 l_s^2}{n}, \qquad \text{(Equation 1)}$$

where $s_1$ is the strut safety factor ($s_1 > 1$), $\Delta P_{atm}$ is the change in atmospheric pressure across the structure's membrane (101.3 kPa for a full vacuum), $l_s$ is the length of a strut, r is the radius of the sphere, $$c = \frac{r}{l_s}$$

is a constant relating the radius of the sphere to the length of the strut, and n is the number of struts in the structure.

Once the average force on a strut is established, we need to determine whether the mode of buckling will be Euler buckling or Johnson buckling. We will have Euler buckling if the ratio of the length of a strut to its radius obeys $$\frac{l_s}{r_s} > \frac{1}{k}\sqrt{\frac{\pi^2 E}{2 S_y}}, \qquad \text{(Equation 2)}$$

where k is the effective length factor of the strut, $r_s$ is the radius of the strut, E is the Young's modulus of the strut, and $S_y$ is the tensile strength of the strut.

We will assume that the endpoints of the struts are fixed so that k=½ in equation 2, which is clearly a very generous assumption for a class 1 tensegrity structure (where one is the maximum number of compression members that may be connected at a node) such as the one in question. To check the truth of the statement that the inequality implies Euler buckling, we can determine the truth of the contrapositive by assuming that the failure will be Johnson buckling. If the failure is by Johnson buckling, then the ratio of the length of the strut to the radius will be $$\frac{l_s}{r_s} < \frac{1}{\sqrt{\frac{s_1 \Delta P_{atm} c^2}{n S_y} + \frac{k^2 S_y}{\pi^2 E}}},$$

so we should have $$\frac{1}{\sqrt{\frac{s_1 \Delta P_{atm} c^2}{n S_y} + \frac{k^2 S_y}{\pi^2 E}}} < \frac{1}{k}\sqrt{\frac{\pi^2 E}{2 S_y}}. \quad \text{(Equation 3)}$$

The properties of diamond are: $\rho_b$=3515 kg/m$^3$, E=1000 GPa, and $S_y$=1 GPa. We will also assume that the strut safety factor is $s_1$=2. Since the inequality in equation 3 is not satisfied with these parameters, we can infer that the mode of failure will be Johnson buckling. Given the mode of failure and the average force on a strut, the average mass of a strut can then be found:

$$m(l_s) = \rho_b \left( \frac{s_1 \Delta P_{atm} \pi c^2}{n S_y} + \frac{k^2 S_y}{\pi E} \right) l_0^3, \quad \text{(Equation 4)}$$

where $\rho_b$ is the density of the strut, $S_y$ is the yield strength of the strut material, E is the Young's modulus of the strut material, and k is the effective length factor of the strut.

The surface tension of the membrane can be found using the Young-Laplace equation to specify the greatest possible strut length (or diameter) for the design, given by:

$$l_s < \frac{2 \sigma_{mem} t}{s_2 c \Delta P_{atm}}, \quad \text{(Equation 5)}$$

where $\sigma_{mem}$ is the yield strength of the membrane fabric, t is the membrane thickness, $\Delta P_{atm}$ is the pressure difference between the membrane exterior and interior, and $s_2$ is the membrane safety factor ($s_2 > 1$).

Assuming the largest possible size for the structure (since if the structure can exist at all, the square-cube law dictates that it will be more efficient as its size increases), it will be light enough to float if its lift capacity is greater than zero. Using the results from equations 4 and 5, the lift capacity will be greater than zero when the following inequality is satisfied:

$$\Delta \rho_{air} \frac{4}{3} \pi c^3 - 2\pi c^3 s_2 \frac{\rho_{mem}}{\sigma_{mem}} \Delta P_{atm} - \quad \text{(Equation 6)}$$
$$n \rho_b \left( \frac{s_1 \Delta P_{atm} \pi c^2}{n S_y} + \frac{k^2 S_y}{\pi E} \right) > 0.$$

The inequality in equation 6 can be strengthened even further by neglecting the weight of the membrane, so that $$\Delta \rho_{air} \frac{4}{3} \pi c^3 - \rho_b \left( \frac{s_1 \Delta P_{atm} \pi c^2}{S_y} + \frac{n k^2 S_y}{\pi E} \right) > 0. \quad \text{(Equation 7)}$$

As mentioned in Shearing's patent, strut length is about ⅙ of the circumference, so $$c = \frac{3}{\pi}$$

in equation 7. The number of struts in Shearing's design is 30, so n=30. The density of air is 1.275 kg/m$^3$, so a completely evacuated structure would have $\Delta \rho_{air}$=1.275 kg/m$^3$. Given all of the above, even with our generous assumptions, the left-hand side of the inequality in equation 7 is still negative. In fact, even if we had optimistically assumed Euler buckling instead of Johnson buckling, the resulting inequality for lift capacity would still not be satisfied.

Thus, even if we assume that Shearing's structure is a perfect sphere, has struts made of diamond, has infinitely strong cables with zero weight that keep the struts perfectly fixed, and has a membrane with zero weight, it will still not be light enough to float after it is evacuated. Those skilled in the art can see that an alternative design is clearly required.

There are several conclusions we may draw from the analysis of Shearing's structure. First, we would like to avoid buckling modes, and have the first mode of failure of a material be failure by compression, which is significantly higher than its first buckling mode. Second, we see that shorter struts are preferable to longer struts, and that fewer struts are preferable to more struts. Third, we see that the strut effective length factor is quite important, and will have a large impact on the lifting capacity of our structure. Finally, we see that the strut material's stiffness (Young's modulus) is more important than its yield strength, and because of the first conclusion, we can say that a strut material's compressive strength is its most important property of all.

BRIEF SUMMARY OF THE INVENTION

The purpose of this invention, which is referred to as a vacuustat, is to generate buoyancy in the atmosphere by means of an evacuated or partially evacuated container, rather than using a lifting gas. This particular vacuustat design comprises a flexible airtight membrane supported by a fractal tensegrity internal structure consisting of a relatively small mass of compressive members forced into higher-order buckling modes through use of tension members.

OBJECTS AND ADVANTAGES

By using a vacuum pump to adjust its internal pressure, a vacuustat can repeatedly ascend to its maximum altitude and descend without losing any lifting capacity. A conventional aerostat, on the other hand, might be forced to vent gas as the aerostat increases its altitude, since its gas expands with increasing altitude and increases stress in the aerostat's membrane. Loss of lifting gas can reduce flight endurance and reduce lifting capacity at lower altitudes. Gas expansion can also make it difficult for aerosats to maintain a constant altitude during diurnal temperature cycles. Because vacuustats do not contain any LTA gas, they should be able to easily maintain a consistent altitude by adjusting their internal pressure.

Vacuustats also have a huge flight endurance advantage over conventional aerostats. Because lifting gasses such as hydrogen and helium tend to diffuse through containers, conventional aerostats lose lifting gas during flight, which reduces their flight endurance and increases their operational costs. Air, on the other hand, is chiefly composed of nitrogen and oxygen, which are larger, heavier molecules that diffuse through solids much more slowly than hydrogen and helium (although the pressure gradient must also be considered). A film coating of a substance with low gas permeability (such as Mylar) on the vacuustat membrane should be sufficient to all but eliminate air diffusion without significantly reducing the vacuustat's useful lift. Furthermore, to counter air diffusion a vacuustat can pump any entering air back out, whereas escaped lifting gas can never be recovered. The power requirements for buoyancy control should be very modest (depending on the membrane material, vacuustat size, and internal pressure) and could probably be supported by a small solar panel. The limiting factor of a vacuustat's flight endurance is likely to be the creep resistance of its structure, meaning that well-designed vacuustats should be capable of remaining aloft for years, if not indefinitely.

Vacuustats should cost less to operate than conventional aerostats due to the fact that they do not need to be replenished with lifting gas, and that they should have very low power requirements for remaining aloft. Vacuustats also have a higher theoretical lifting efficiency than conventional aerostats, although this advantage may be difficult to realize in practice.

REFERENCE NUMERALS IN THE DRAWINGS 10 external strings or external iterated compressive members
12 membrane
14 horizontal bar, or primary compressive member
16 vertical bar, or auxiliary compressive member
18 internal string
20 cross-string
22 connecting joint for vertical bars
24 membrane contact cap joint
26 vertical bar cap joint
28 central contact cap joint
30 iterated 3D T-bar
32 centerpiece joint

DETAILED DESCRIPTION OF THE INVENTION

Figure 1:
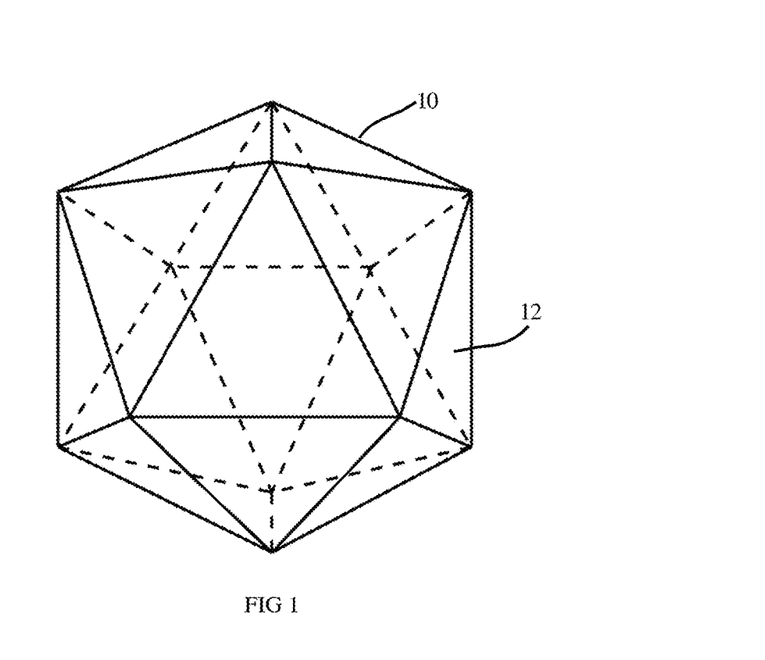
FIG. 1 illustrates the shape of the membrane supported by six struts intersecting at the center of the icosahedron, with the edges of the icosahedron representing the vacuustat's external members connecting the struts.

Consider an icosahedron as shown in FIG. 1. The figure shows the shape of the membrane 12 that will be supported by six struts under uniaxial compression intersecting through the center of the icosahedron, held in place by 24 components (the edges of the icosahedron), which will be referred to as external strings 10, but could also be substituted with compressive members if necessary. If a vacuustat were constructed as shown in FIG. 1, with an airtight fabric membrane covering the structure (including the external strings) and the struts constructed as columns of some material, such as steel or carbon fiber, the mass of the columns required to prevent buckling would be too large for the vacuustat to achieve buoyancy. Fortunately, a straight column is not the most mass-efficient structure capable of withstanding a given force.

There are three important physical criteria that must be satisfied in order for the vacuustat to achieve buoyancy while maintaining the integrity of its internal structure. First, the vacuustat's internal structure must be capable of withstanding the forces being applied to it. Second, the vacuustat's membrane must be capable of withstanding the surface tension being applied to it. Third, the vacuustat must weigh less than the air that it is displacing.

To quantify the first criteria, the force being applied to a given end of a strut in a vacuustat can be written as:

$$f(l_o) = c_f l_o^2, \text{ with } c_f = \frac{s_1 \Delta P_{atm} c_x \sqrt{1+\varphi^2}}{2(1+\varphi)}, \quad \text{(Equation 8)}$$

$$\text{and } c_x = \frac{1+\varphi}{2\sqrt{5}},$$

where $l_o$ is the length of a strut, $s_1$ is the strut safety factor ($s_1 > 1$), $\Delta P_{atm}$ is the change in pressure between the inside and outside of the vacuustat, and $\varphi$ is the golden ratio.

The mass of a strut that is constructed as a straight column of material capable of withstanding the force being applied to it is:

$$m(l_o) = c_b l_o^3, \text{ where } c_b = \rho_b \left( \frac{c_f}{S_y} + \frac{k^2 S_y}{\pi E} \right), \quad \text{(Equation 9)}$$

and $\rho_b$ is the density of the strut material, $S_y$ is the yield strength of the strut material, E is the Young's Modulus of the strut material, and k is the effective length factor.

Equation 9 assumes that the slenderness ratio of a column capable of withstanding the force being applied to it will be below the transition where the critical force is governed by Johnson buckling rather than Euler buckling. This assumption should hold for the materials under consideration for the vacuustat, and will underestimate the critical buckling force whenever it is not applicable. When the endpoints of the struts are fixed we will have k=½, which may not be entirely accurate in practice. If the endpoints of the struts are not sufficiently constrained by the external strings, the external strings may be substituted with external compressive members.

The second criteria specifies a maximum allowable surface area for a given membrane material. Using the Young- Laplace equation for the surface tension of a membrane separating a pressure difference, the maximum strut length of the vacuustat is given by:

$$l_0 < \frac{2(1+\sqrt{3})\sigma_{mem}t}{s_2 \Delta P_{atm} c_x \sqrt{1+\varphi^2}}, \qquad \text{(Equation 10)}$$

where t is the membrane thickness, $\sigma_{mem}$ is the yield strength of the membrane fabric, and $s_2$ is the membrane safety factor ($s_2>1$).

The membrane may still need to be reinforced where it comes into contact with the struts, due to possible stress concentrations near the meeting of the membrane and the strut. To study vacuustats with a strut length smaller than $l_{o(max)}$ with a given membrane material, simply increase the membrane safety factor $s_2$.

The third criteria specifies the useful lifting capacity of the vacuustat, given by:

$$C(l_o) = \frac{\Delta \rho_{air}(5+3\sqrt{5})}{12\varphi\sqrt{1+\varphi^2}} l_0^3 - \frac{\rho_{mem}\sqrt{5}\sqrt{3}\,t}{\varphi} l_0^2 - 6\mu_{n*} c_b l_0^3, \qquad \text{(Equation 11)}$$

where $\Delta \rho_{air}$ is the change in air density between the outside and the inside of the vacuustat.

Obviously we must have $C(l_o)>0$, otherwise the vacuustat cannot achieve buoyancy. The first term of equation 11 is the weight of the air displaced by the vacuustat, the second term is the weight of the membrane, and the third term is the weight of the struts, which includes the external strings. Note that the third term can be re-written as $6\mu_{n*}m(l_o)$, where $\mu_{n*}$ is a mass-reduction factor that will be explained shortly.

Figure 2:
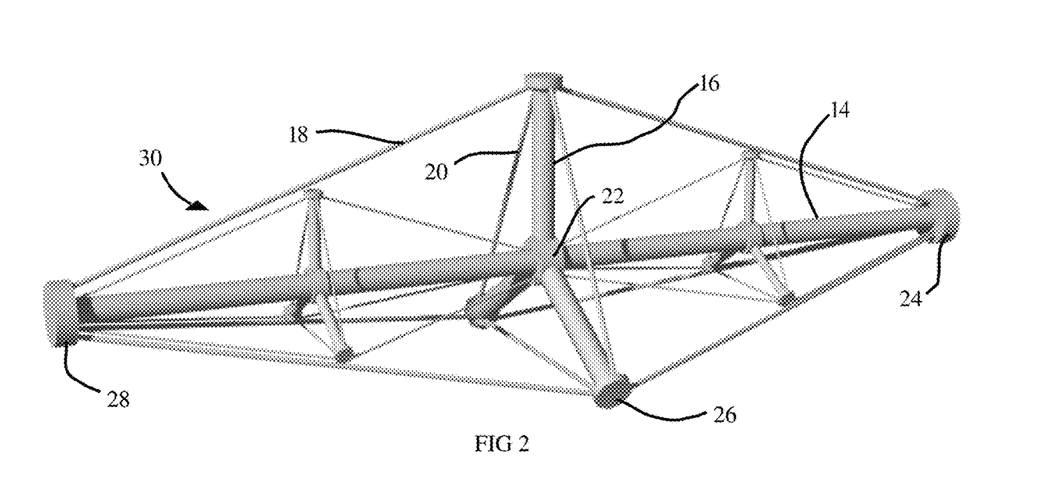
FIG. 2 illustrates a 3D iterated T-bar in its second iteration.

As mentioned before, a straight column of material is not necessarily the most mass-efficient structure capable of withstanding a given force. An alternative structure, which will be referred to as an iterated 3D T-bar 30, is presented in FIG. 2 (in which the number of iterations is two). A single unit of the iterated 3D T-bar consists of two horizontal bars (compressive members) 14 of equal length and three vertical bars 16 of equal length, spaced 120 degrees apart and radially attached to a connecting joint for the vertical bars 22. Both types of bars are held in place by a number of tension members, which will be referred to as strings. The horizontal bars are held in place by internal strings 18, and the vertical bars are held in place by cross strings 20, with each vertical bar attached to the cross strings by a vertical bar cap joint 26. In the first iteration of a 2D T-bar, the length of the horizontal bars is referred to as $$l_1 = \frac{l_o}{2},$$

the length of the vertical bars is referred to as $l_v$, the length of the strings is referred to as $s_1$, and the angle of the strings is referred to as $\alpha_1$.

Figure 3:
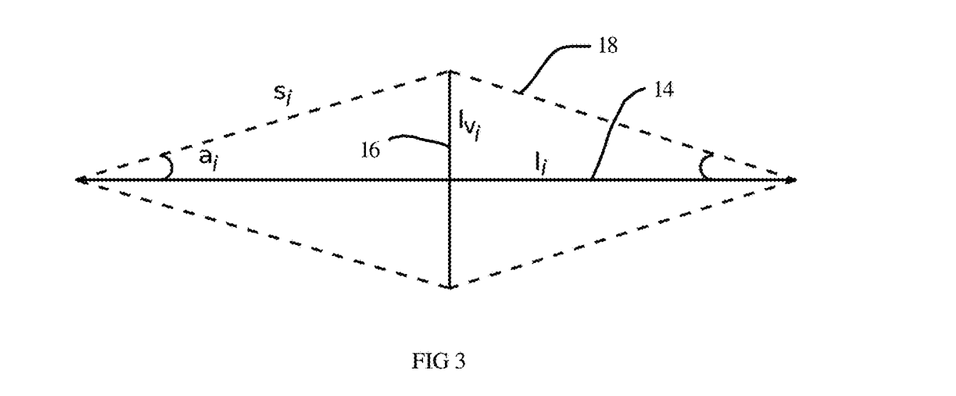
FIG. 3 illustrates one 2D unit of an iterated T-bar.

To understand the analysis of the 3D T-bar, it is helpful to consider a 2D unit first, as shown in FIG. 3, where the bars are represented by solid lines and the strings are represented by dotted lines. For the purpose of analysis, the joint connecting the bars together is assumed to be a frictionless ball joint. If a T-bar is found to save weight when substituted for a column, then further weight reduction may be possible by substituting the horizontal bars of the T-bar for additional T-bars. The lengths and angles of the $i^{th}$ iteration of a single T-bar unit would then be as shown in FIG. 3. In the iterated T-bar, the angles of strings and lengths of vertical bars can vary, although the length of an ith horizontal bar is always given by $$l_i = \frac{l_o}{2^i}.$$

The force being applied to each end of a given horizontal bar is $f(l_o)$, which is the same as the force that is being applied to the entire column. However, decreasing the length of a column increases its critical buckling force. For a column that fails by Euler buckling, for example, cutting the length of the column in half increases its critical buckling force by a factor of four. The mass of the column can then be reduced to keep the critical buckling force constant as the column's length decreases.

Because each iteration of the T-bar halves the distance over which the column can buckle, we can use the T-bar to obtain a reduction in mass over a straight column. From equation 9, the mass of each column in the vacuustat is given by $m(l_o)=c_b l_o^3$, so the mass-reduction factor of the horizontal bars of a T-bar after one iteration can be calculated as:

$$\frac{2m(l_1)}{m(l_o)} = \frac{2c_b l_1^3}{c_b l_o^3} = \frac{2c_b l_o^3}{8 c_b l_o^3} = \frac{1}{4}.$$

Unfortunately, the process of dividing $l_o$ into halves cannot be repeated ad infinitum to reduce the mass of the column to zero, for two reasons. First, the weight of the vertical bars and strings (which will be addressed shortly) also increases with the number of iterations, causing the strut to eventually gain more weight than it loses after a certain number of iterations, depending on the lengths of the vertical bars and the angles of the strings. Even before this happens, however, the critical buckling force will usually exceed the critical compressive force of the horizontal bar, and the bar will fail by compression. In this case, the maximum number of times a strut can be iterated is given by:

$$n^\Phi = \left[\log_4 \frac{\sigma_b}{c_f} + \log_4 \frac{c_b}{\rho_b}\right], \qquad \text{(Equation 12)}$$

where $\sigma_b$ is the compressive strength of the strut, with brackets representing the floor function.

For most materials suitable for a vacuustat, $n^\Phi$ in equation 12 is either 2 or 3. The first iteration is equivalent to a single unit of FIG. 2, the second iteration is equivalent to FIG. 2 in its entirety, and subsequent iterations continue to halve the length over which the T-bar can buckle.

If the force applied to a strut is entirely uniaxial, then the force being applied to the T-bar strings is zero. However, the T-bar exists in an unstable equilibrium, and when the T-bar is bent away from its equilibrium, some of the strings will experience tension. The maximum tension that may be applied to the strings can be estimated by imagining that the strings on one side of the T-bar are fully elongated, and calculating the vertical force that is being applied to the strings in that situation.

The maximum elongation of a string is an intrinsic property given by:

$$\epsilon = \frac{S_y}{E}.$$

Figure 4:
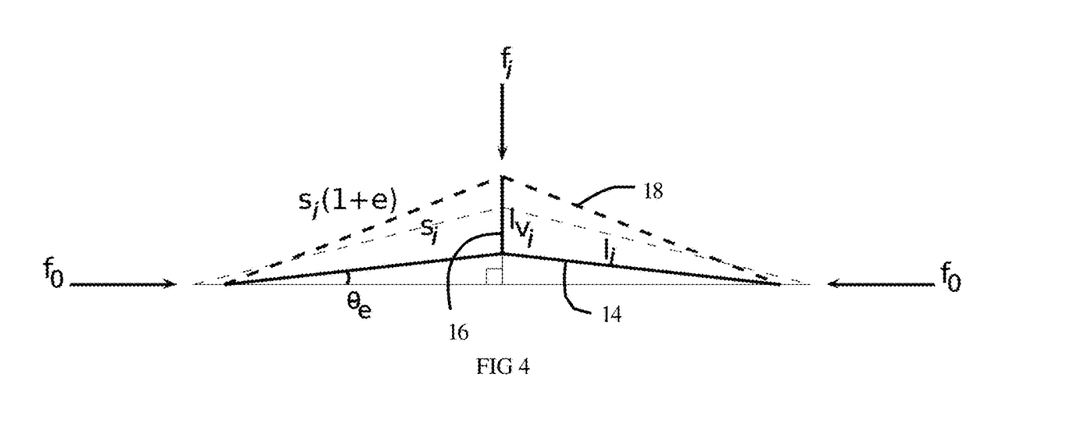
FIG. 4 illustrates the upper half of a 2D unit of an iterated T-bar bending under uniaxial compression.

To determine how far a strut might bend away from equilibrium, consider the diagram in FIG. 4. From the geometry of the diagram, the ratio of vertical force to horizontal force in the T-bar when the strings on one side are fully elongated can be approximated by:

$$\zeta_i \approx \frac{\epsilon(\epsilon+2)(1+\tan^2\alpha_i)}{2\tan\alpha_i}, \text{ where } i > 1. \quad \text{(Equation 13)}$$

Figure 5:
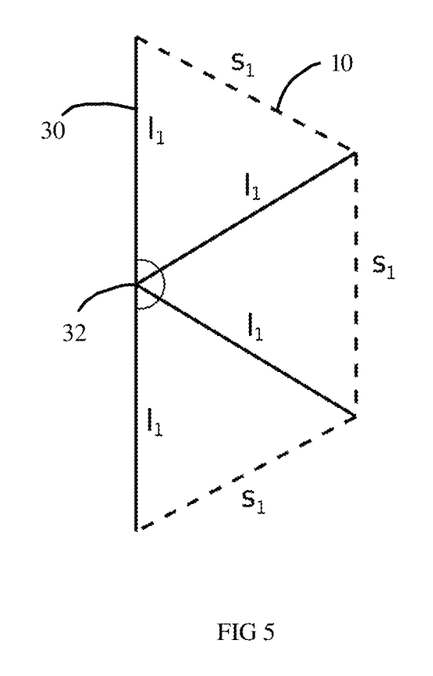
FIG. 5 illustrates the left side of a projection of the vacuustat's struts and external members.

A similar argument can be used to approximate $\zeta_1$. FIG. 5 shows half of a projection of an icosahedron oriented with two vertices as its highest and lowest points. The ratio of vertical force to horizontal force in the T-bar when the strings on one side are fully elongated can be approximated by:

$$\zeta_1 \approx \frac{2\epsilon(\epsilon+2)}{1+\varphi^2}. \quad \text{(Equation 14)}$$

Using $\zeta$ from equations 13 and 14, the mass of the strings required to resist the force being applied to them at their point of maximum elongation can then be calculated. Likewise, the mass of the vertical bars can be calculated as the mass required to resist the force being applied to them by the strings at their point of maximum elongation.

The overall mass-reduction factor $\mu_n$ for a 3D T-bar is then given by:

$$\mu_n = \frac{1}{4^n} + \frac{3}{2c_b}\sum_{i=2}^{n}\frac{c_{bi}\tan^3\alpha_i}{4^i} + \quad \text{(Equation 15)}$$

$$\frac{5c_s c_f \zeta_1}{2c_b} + \frac{3c_s c_f}{c_b}\sum_{i=2}^{n}\frac{\zeta_i}{\sin 2\alpha_i},$$

$$\text{where } c_{bi} = p_b\left(\frac{\zeta_i c_f}{S_y} + \frac{k^2 S_y \tan^2\alpha_i}{4^i \pi E}\right),$$

$$\text{and } c_s = \frac{\rho_s}{\sigma_s},$$

where $\rho_s$ is the density of the string material, and $\sigma_s$ is the tensile strength of the string material.

The first term in equation 15 represents the mass reduction of the horizontal bars, the second term represents the mass of the vertical bars, and the third term represents the mass of the external strings, and the fourth term represents the mass of the internal strings. The mass of the cross-strings (the strings connected solely to the vertical bars) is assumed to be negligible, since they will not be subjected to large forces.

The optimal angle of the strings requires some experimentation, but can be found easily with a computer program that calculates $\mu_n$ for various angles. If the angle is too large, then the strings add too much mass. If the angle is too small, however, then the force required by the strings to return the T-bar to equilibrium is too high, due to the amount of torque required.

Figure 6:
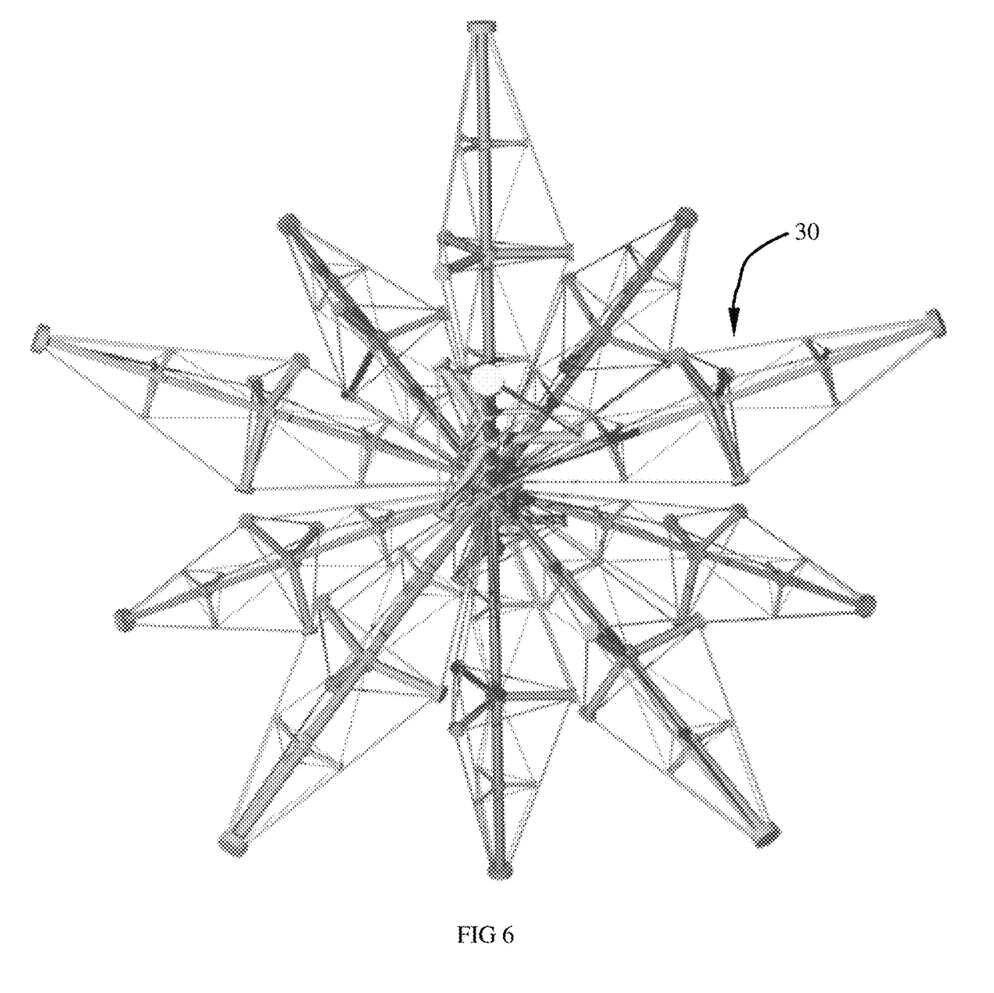
FIG. 6 illustrates an example of the internal structure of a vacuustat, with the struts iterated twice and arranged radially around a central dodecahedral joint.

The minimum safety factors that have been considered for any designs are $s_1 = s_2 = 2$, and in the following discussion the safety factors can be assumed as such. Using the formulas above in conjunction with the materials that will be discussed shortly, vacuustats can be constructed with lifting efficiencies of more than 60%, and strut lengths (diameters) as small as approximately 2 meters. An example of a vacuustat's internal structure with iterated 3D T-bars is shown in FIG. 6, with 12 iterated 3D T-bars resting on a dodecahedral centerpiece joint 32. Each iterated 3D T-bar is attached to the centerpiece by its central contact cap joint 28, and is attached to the membrane by its membrane contact cap joint 24. The centerpiece could be made from any light-weight material with a reasonable bulk modulus.

One additional design modification that can contribute to lowering $\mu_n$ is replacing the bars in the T-bar with hollow cylinders, which have a higher area moment of inertia than solid rods. The analysis for this case is similar to what has already been described.

The best membrane material found so far is Dyneema, an ultra-high-molecular-weight-polyethylene (UHMWPE) fiber with a density of 970 kg/m³ and a tensile strength of 3.4 GPa (as manufactured by DSM). Dyneema allows the construction of 100%-vacuustats with strut lengths as long as 16 meters, as shown by equation 10. The Dyneema membrane could be coated with a Mylar film to ensure gas impermeability. For vacuustats with partial vacuums, Dyneema could be substituted with a weaker but lighter fiber, such as a flax fiber composite or possibly synthetic spider silk (which seems to be close to commercial production).

The best string material found so far is Zylon HM, an UHMWPE fiber with a density of 1560 kg/m³ and a tensile strength of 5.8 GPa.

Some suitable materials that have been found for the horizontal bars in the T-bars are the following ceramics: Boron carbide ($B_4C$), hot-pressed silicon carbide (SiC-HP), alumina/silicon carbide composite ($Al_2O_3$/SiC), and pure alumina ($Al_2O_3$). A non-ceramic material that may also be suitable is boron fiber, although the data on its compressive strength is less complete.

The boundary conditions on the struts, as mentioned before, can significantly reduce the critical buckling force of the strut if the endpoints do not remain fixed. For this reason, both the external strings and the T-bar strings should be somewhat larger than necessary and pre-stressed (placed under a certain initial amount of tension) to reduce rotation, changes in slope, and lateral movement of the endpoints of bars. Failing this, the external strings could also be substituted with external iterated compressive members.

Instead of having the joints 22 dividing the horizontal sections of the T-bar behaving similar to an ideal ball joint, the joint could instead be a ring with attachments for the vertical bars and for strings, as shown in FIG. 2. Using rings instead of ball joints should make the endpoint conditions closer to being fixed rather than pinned. The ends of the vertical bars can have capped joints 26 with attachments for strings. The attachments can be designed similar to a winch, a come-along, or a guitar tuning peg, which utilizes a worm drive for adjusting string tension. String tension could also be adjusted by a turnbuckle. The attachment should also have a locking mechanism, such as a pin, to prevent the tension from changing unintentionally. In any case, the attachment should be designed so that the tension of the connecting string can easily be adjusted, either by hand or by an automatic control mechanism.

Another option for reducing $\mu_n$ is to place strain gauges along the horizontal members of the T-bars, and connect them to communicate with actuators controlling the string tension. In this manner a feedback mechanism can be designed so that if a displacement is detected along a certain axis, it can quickly be countered. Andrew Berlin's 1994 PhD thesis "Towards Intelligent Structures: Active Control of Buckling" demonstrated that active control of buckling could allow a steel column with piezo-ceramic actuators to support 5.6 times more load than without, which strongly suggests that intelligent control of structures to prevent buckling could also improve the performance of vacuustats. Vibration dampeners could also be placed on the strings to diminish undesirable variations in tension.

For our earlier analysis, the vertical bars were assumed to be made of the same material as the horizontal bars, but since the vertical bars do not have to withstand as much compressive force, more light-weight materials such as carbon fiber or boron fiber might be effectively substituted. The ends of the vertical bars could also be threaded to attach to the horizontal bars more securely, again to reduce their effective length factor. Likewise, the horizontal bars could all be threaded in their attachment to the dodecahedral centerpiece.

OPERATION OF THE INVENTION

As an airship rises, air pressure and air density outside the ship drop significantly with altitude, reducing the gross lifting capacity of the ship and causing the lifting gas inside to expand. If the expanding gas is not vented off, it may tear open the hull of the ship. Once the gas is vented off, however, it cannot be recovered, and the ship loses lifting capacity at lower altitudes. To descend, the airship takes on air ballast to increase its weight. After the ship reaches a lower altitude, pumping out too much air ballast puts pressure on the hull of the ship due to its reduced volume of lifting gas, so if the ship climbs too high, perhaps by being swept upward by a storm, it may not be able to climb up again after it returns to lower altitudes. The USS Macon was lost this way during a storm in 1935. Not only does gas expansion limit an airship's service ceiling and pose a threat to the ship, it also makes the ship more expensive to operate, particularly when the lifting gas is an expensive, non-renewable resource such as helium, as with modern dirigibles.

Since a vacuustat does not contain any LTA gas, it can bypass the problem of gas expansion altogether by using a vacuum pump to adjust its internal pressure. In this manner a vacuustat can repeatedly ascend to its maximum altitude and descend without losing any lifting capacity, and can also retain buoyancy control to remain at a stable altitude during the diurnal temperature cycle.

At first glance, a vacuustat's altitude ceiling is nearly as limited as a conventional aerostat's. A vacuustat designed to withstand a full vacuum at sea level could rise at most about 4 km, regardless of its size and lifting capacity. This is because its structural weight would remain fixed while its lifting capacity would steadily decrease with altitude, reaching zero around 4 km. With a full payload its altitude ceiling might be even lower than a conventional aerostat's.

Instead of a vacuustat that maintains a full vacuum at sea level, however, consider a vacuustat that achieves buoyancy with only a 10% vacuum, roughly a 10 kPa pressure difference between the inside and outside of its membrane. The 10%-vacuustat's structure would have to be much lighter to achieve buoyancy, since it would produce ten times less buoyant force than a 100%-vacuustat, but on the other hand, the atmospheric pressure on the 10%-vacuustat would also be ten times less. The requirements to design a 10%-vacuustat are in fact nearly identical to the requirements to design a 100%-vacuustat.

The advantage of the 10%-vacuustat is that it can pump out air as it rises, maintaining its 10 kPa difference up to 16 km, where atmospheric pressure is reduced to 10 kPa. At 16 km the vacuustat is maintaining a full vacuum, and like the 100%-vacuustat at sea level, it can rise another 4 km before reaching an altitude ceiling of roughly 20 km (assuming it is carrying no payload; otherwise it cannot fully ascend the last 4 km).

The 10%-vacuustat would have a lifting efficiency of at most 10%, which would be unsuitable for passenger or cargo transport, but low lifting efficiencies could be acceptable for reasonably-sized high-altitude unmanned vehicles carrying several hundred pounds. A compromise for passenger or cargo transport might be a 60%-vacuustat capable of carrying several thousand pounds to altitudes of 4 to 8 km (easily above the height of the Rocky Mountains), with a lifting efficiency of about 33%.

One additional desirable aspect of the 10%-vacuustat is that at 16 km, the altitude up to which the 10%-vacuustat can carry a full payload, the ratio of air-density-to-pressure in the Earth's atmosphere reaches a maximum, allowing the vacuustat to either slightly increase its carrying capacity, or to maintain its current payload with a higher internal pressure, resulting in less atmospheric force on its structure.

After meteorological considerations, the best altitude for a station-keeping vacuustat is most likely around 18-20 km, which is where stratospheric winds generally reach a local minimum. This would correspond to a 7.5% to 5.5%-vacuustat capable of carrying a full payload to its cruising altitude. An important cost consideration is that vacuustats designed for higher altitudes must be larger in order to achieve buoyancy.

Manned vacuustats or vacuustats carrying heavy payloads over populated areas would have several unique safety issues that would have to be addressed. First, a rupture in the vacuustat's membrane would cause rapid re-pressurization and loss of altitude, particularly for vacuustats operating near 100% vacuum. By comparison, a conventional aerostat's lifting gas is contained at nearly the same pressure as the air outside, and conventional dirigibles can still land safely hours after a rupture. A vacuustat's membrane would by necessity be much tougher to begin with than a conventional aerostat's, making such ruptures less likely; however, precautions would still have to be made.

There are two safety precautions that might be taken: First, the interior of the vacuustat could be divided into compartments, so that the rupture of an exterior membrane would not cause complete re-pressurization. Second, large vacuustats could utilize multiple vacuustat units, so that the failure of one would not cause the system to lose buoyancy.

The second way that a vacuustat could fail is by failure of a component of its internal structure. Again, having multiple vacuustat units is the best way to mitigate this for large vacuustats. Unlike a rupture of the membrane, structural failure of a major component inside a vacuustat would not necessarily lead to a complete loss of buoyancy. If one component fails, this will cause a reduction in the vacuustat's volume, which should reduce the pressure on the rest of the structure. Also, the internal structure of the vacuustat can and should be designed with safety factors large enough for the structure to be able to maintain most of its volume even if one component fails. Vacuustats could also be designed to detect when a component is near failure and allow partial re-pressurization or initiate failure in a controlled manner to minimize the component failure's impact on the rest of the structure.

Vacuustats are a very attractive candidate technology for the potential establishment of a long-endurance station-keeping high-altitude platform (HAP). Station-keeping HAP's could provide high speed communications and/or surveillance at a fraction of the cost of a satellite, while also being much more accessible for equipment upgrades and repairs. Roughly a dozen such "vacuustatellites" hovering at 18 km might be sufficient to provide service coverage for the entire continental United States. In addition, vacuustatellite communications would have negligible latency compared to geostationary satellites, which orbit at roughly 3700 km and have ¼-second round-trip communication delay. Low-Earth orbit (LEO) satellites do not have as much latency, but they require an expensive satellite network to guarantee service.

Another possible application of vacuustats is for use in airborne wind turbines. The power that can be harvested from the wind is given by $$P = \frac{1}{2} A \rho_{air} v^3, \quad \text{(Equation 16)}$$

where A is the area in contact with the wind, $\rho_{air}$ is the density of air, and v is the velocity of the wind. Because wind power is proportional to the velocity of the wind cubed, a small increase in the average velocity of the wind will have a large effect on the amount of power that can be generated. Wind speeds in the atmosphere rise consistently up to altitudes of 10 km and beyond. Industrial wind turbines generally stand about 100 meters tall, while Federal Aviation Administration (FAA) regulations currently mandate a maximum height of approximately 600 meters for airborne wind turbines. Using the wind profile power law, which states that wind speed is proportional to the seventh root of altitude, we can estimate that an airborne wind turbine at an altitude of 600 meters would experience 29% higher wind velocities, and would produce 116% more power. In addition to this increase in expected power, tethered vacuustats would also be able to support vertical axis wind turbines (VAWTs) of a much larger scale than what ground-based VAWT's can be built to, since their structural support would be coming from above rather than from below. In contrast, the blade size of horizontal axis wind turbines (HAWT's) is limited regardless of altitude, due to the fact that structural support is based from the turbine's hub. From equation 16, we can also see that an increase in blade area can yield further increases in power production.

Vacuustats could also be used as a strategic defensive platform against rockets and missiles. Tethered vacuustats could provide communications and surveillance over smaller areas. Vacuustats could also be substituted for other uses of conventional airships and balloons, such as advertising, transport, and disaster relief.

DESCRIPTION AND OPERATON OF ALTERNATIVE EMBODIMENTS

Vacuustats with the design depicted in FIG. 1 and FIG. 6 can be constructed with a variety of different materials for the struts, joints, strings, centerpiece, and membrane, as previously discussed. Considerations may include cost, lifting capacity, flight endurance, durability, manufacturability, and so on. There are also a variety of different ways that the joints may be constructed, as mentioned before, with various mechanisms, either manual or automatic, to adjust the tension of strings. In practice it may be more practical to use hollow cylinders rather than solid cylinders for the T-bars, since hollow cylinders are superior to solid cylinders for the purpose of providing strength at a given weight.

In addition, the icosahedron is not the only shape that might be used for the vacuustat structure, although the icosahedral design does appear to have the greatest lifting efficiency of all of the platonic solids. Other polyhedra such Archimedean solids might also be employed as viable structures, possibly even more efficient than the icosahedron; this could be a subject of further analysis. T-bars could also be constructed with more than three vertical bars per iteration, although this would add to the weight of the structure without conferring any obvious advantage.

CONCLUSIONS, RAMIFICATIONS, AND SCOPE OF INVENTION

A fractal tensegrity design for lighter-than-air (LTA) structures is presented, which may be used to generate buoyancy in the atmosphere by evacuating air from the structure's interior. The advantages of such a design include superior buoyancy control for ascent and descent, greatly increased flight endurance, and cost-effectiveness in manufacturing and operation.

While my invention as described above contains many specificities, these should not be construed as limitations on the scope of the invention, but rather as an exemplification of one preferred embodiment thereof. Many other variations are possible. For example, hollow cylinders could replace solid bars, and polyhedra other than the icosahedron, such as Archimedean solids, might also be used as structures for vacuustat designs. The equations discussed above should be interpreted as an aid for demonstrating the viability of certain types of vacuustats, which in general may require alternative equations or analyses to fully model. Accordingly, the scope of the invention should be determined not by the embodiment(s) illustrated, but by the appended claims and their legal equivalents.

What is claimed is:
1. A device capable of being buoyant in the atmosphere, comprising:
   a. a central attachment point for attaching thereto a multiplicity of support members external to the central attachment point, the support members including:
      a primary compression member having sufficient strength to withstand compressive forces from outside said device;
      a multitude of auxiliary compression members placed radially to said primary compression member, and connected to said primary compression member, said auxiliary compression members having sufficient strength to counteract at least one buckling mode in said primary compression member;
      a multitude of connective means for radially joining said primary compression member and said auxiliary compression members;
      a multitude of tension members joining said primary compression member to said auxiliary compression members; and means for connecting said primary compression member to the central attachment point;
b. a membrane with an enclosed volume encompassing said central attachment point therein;
c. wherein air displaced by said device has a mass greater than a mass of said device together with contents of said enclosed volume, whereby said device, when evacuated, is buoyant in the atmosphere; and
d. wherein said device gains a principal lift component from evacuation rather than from a lighter-than-air gas.

2. The device as recited in claim 1, wherein said membrane comprises a layer of material:
a. sufficient for decreasing the permeability of said membrane to air; and
b. sufficient for preventing said membrane from rupturing under pressure.

3. The device as recited in claim 2, wherein said primary or auxiliary compression members are hollow rather than solid, whereby the area moment of inertia of said compression members under axial compression is increased.

4. The device as recited in claim 3, further comprising a means for adjusting the internal buoyancy of said device, whereby said device is able to ascend and descend in the atmosphere.

5. The device as recited in claim 4, further comprising a multitude of strain gauges and actuators sufficient for either increasing the force required to buckle said primary compression members or decreasing the mass required to maintain the structural integrity of said primary compression members.

6. The device as recited in claim 5, wherein said primary compression member is made from at least one material selected from the following group consisting of: Boron carbide, silicon carbide, alumina, and boron fiber.

7. The device as recited in claim 6, wherein said tension members are made from ultra-high-molecular-weight polyethylene.

8. A device capable of being buoyant in the atmosphere, comprising:
a. a central attachment point for attaching thereto a multiplicity of support members external to the central attachment point, the support members including:
  a primary compression member having sufficient strength to withstand compressive forces from outside said device;
  a multitude of auxiliary compression members placed radially to said primary compression member, and connected to said primary compression member, said auxiliary compression members having sufficient strength to counteract at least one buckling mode in said primary compression member;
  a multitude of connective means for radially joining said primary compression member and said auxiliary compression members;
  a multitude of tension members joining said primary compression member to said auxiliary compression members; and
  means for connecting said primary compression member to the central attachment point;
b. a membrane with an enclosed volume encompassing said central attachment point therein;
c. wherein said membrane comprises a layer of material sufficient for decreasing the permeability of said membrane to air and a layer of material sufficient for preventing said membrane from rupturing under pressure;
d. wherein air displaced by said device has a mass greater than a mass of said device together with contents of said enclosed volume, whereby said device, once evacuated, is buoyant in the atmosphere; and
e. wherein said device gains a principal lift component from evacuation rather than from a lighter-than-air gas.

* * * * *